United States Patent [19]

Lee et al.

[11] Patent Number: 4,815,095
[45] Date of Patent: Mar. 21, 1989

[54] RESONANT LASER CAVITY SYSTEM

[75] Inventors: Richard H. C. Lee; John C. C. Hwang; Ing J. Ma; Ching F. Lin, all of Taipei, Taiwan

[73] Assignee: Scienchem Laser Co., Ltd., Taipei, Taiwan

[21] Appl. No.: 140,135

[22] Filed: Dec. 31, 1987

[51] Int. Cl.⁴ .............................................. H01S 3/08
[52] U.S. Cl. ...................................... 372/107; 372/35
[58] Field of Search ................ 372/34, 35, 87, 92, 372/107

[56] References Cited

U.S. PATENT DOCUMENTS

| | | | |
|---|---|---|---|
| 4,201,951 | 5/1980 | Mohler | 372/107 |
| 4,479,225 | 10/1984 | Mohler et al. | 372/107 |
| 4,613,972 | 9/1986 | Bettman | 372/107 |

FOREIGN PATENT DOCUMENTS 0021584  2/1985  Japan .................................. 372/35

Primary Examiner—William L. Sikes
Assistant Examiner—B. Randolph
Attorney, Agent, or Firm—Morton J. Rosenberg

[57] ABSTRACT

A resonant laser cavity system (10) is provided which is divided into three sections (20, 22 and 24). Sections (20 and 24) include a pair of opposing discharge tube members each including an outer discharge tube (28) and an inner discharge tube (26). On opposing ends of resonant laser cavity system (10) there is provided a mirror mounting mechanism (48) which includes a tubular mount housing (50) upon which is mounted a mirror member (58) positionally located through a plurality of metal clamp members (60) inserted within housing grooves (62) and resiliently coupled to the mirror members (58) through a coil spring (64). The inner discharge tube (26) is formed of a Pyrex composition and the outer discharge tube (28) is formed of an acrylic composition.

2 Claims, 7 Drawing Sheets

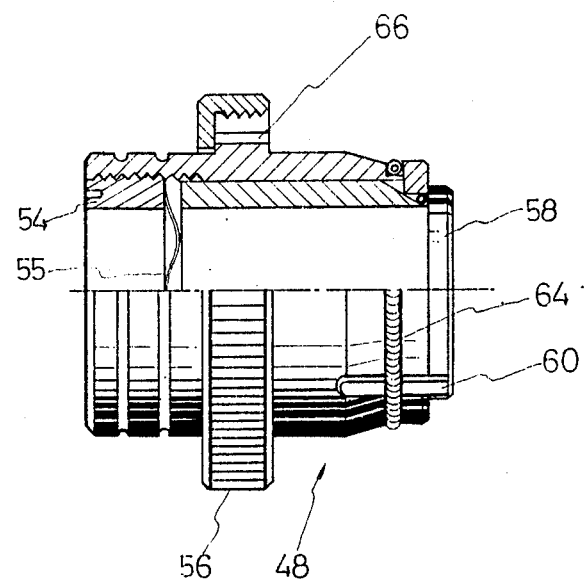
F I G . 6

4,815,095

RESONANT LASER CAVITY SYSTEM

BACKGROUND OF THE INVENTION

The subject invention concept is directed to a resonant laser cavity system for particular use as a resonant cavity for a $CO_2$ laser. The subject system includes a system formed of three sections defining a pair of opposing discharge tube members being axially aligned. Further, the opposing discharge tube members sandwich a center section formed of an acrylic resin. More in particular, the opposing discharge tube members are each formed of coaxial tubes with the inner tubes being formed of Pyrex glass and the outer tubes formed of an acrylic resin. More in particular, the subject invention directs itself to a mounting mechanism for mirror members including mirror mounting plates having inlet and outlet for cooling oil flow. Still further, the cooling oil flows through the mirror mounting mechanism when the mirror mountings are coupled to laser heads. Further, the cooling oil absorbs a large amount of heat produced by laser discharge in the overall resonant laser cavity system to provide a more efficient and advantageous operational phase.

Still further, the subject system includes mirror members which are held without threaded screw mountings. Further, the system includes a plurality of metal clamp clips positioned on the mirror mounting. More in particular, the invention directs itself to a plurality of clip members which are releasably coupled to the mirror mount by a coil spring which allows displacement along the radial direction to maintain the central portion of the mirror members in an unchanged location during assembly. More in particular, the subject system includes a tubular housing or mirror mount having a slot or groove formed in a cylindrical outer surface to mate with a bar member on a laser head in order that there is no relative motion between the mirror members and the internal O-rings. Thus, there is no necessity for any re-alignment subsequent to optics having been initially aligned.

SUMMARY OF THE INVENTION

A resonant laser cavity system is provided having a pair of opposing discharge tube members. A central gas outlet tube member is in communication with and sandwiched between the discharge tube members. The opposing discharge tube members define a resonant cavity having mirror members secured on opposing ends thereof. A mounting mechanism is provided for each of the mirror members at respective ends of the resonant cavity. The mounting mechanism for each of the mirror members includes a tubular mount housing having external walls with circumferentially displaced grooves. A plurality of clip members are insertable within the grooves for securing one of the mirror members to the mount housing. A coil spring member is securable around the clip members for releasably securing one of the mirror members. Each of the discharge tube members includes an inner tube formed of Pyrex and an outer tube concentrically located with respect to the inner tube. The outer tube is formed of an acrylic composition and further the system includes a cooling oil conduit helically coiled around the inner tube.

BRIEF DESCRIPTION OF THE DRAWINGS:

FIG. 6 is a cross-sectional view of the mirror mounting mechanism in assembled formation;

DESCRIPTION OF THE PREFERRED EMBODIMENTS

Figure 1:
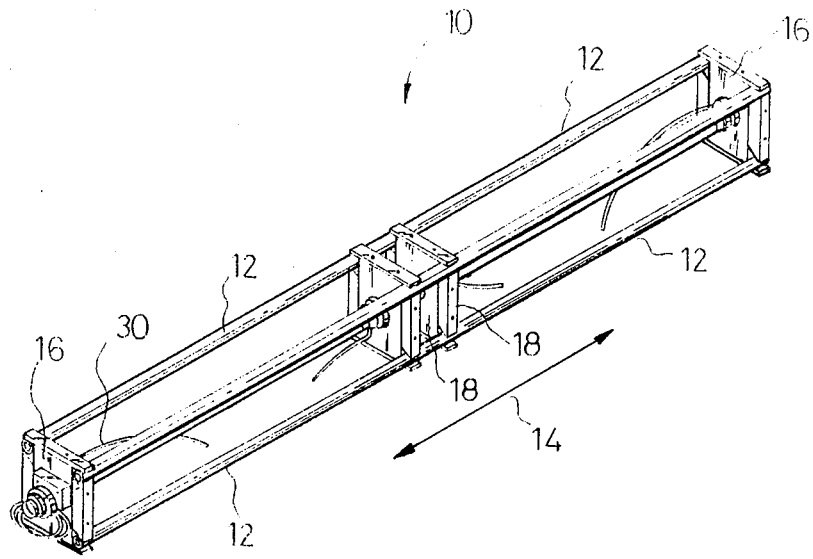
FIG. 1 is a perspective view of the resonant laser cavity system as assembled.

Referring now to FIGS. 1-9, there is shown resonant laser cavity system 10 which is of the axial flow type. As can be clearly seen in FIGS. 1 and 2, resonant laser cavity system 10 includes a support structure having stainless steel rod members 12 extending in axial direction 14. As can be seen, system 10 includes a pair of opposing frame mounting plates 16 and a pair of internal plate members 18. Plate members 16 and 18 divide resonant laser cavity system 10 into sections 20, 22 and 24 as is shown in the schematic FIG. 3. Sections 20 and 24 are identical in composition and sandwich section 22 therebetween in a coincident axial manner.

Figure 3:
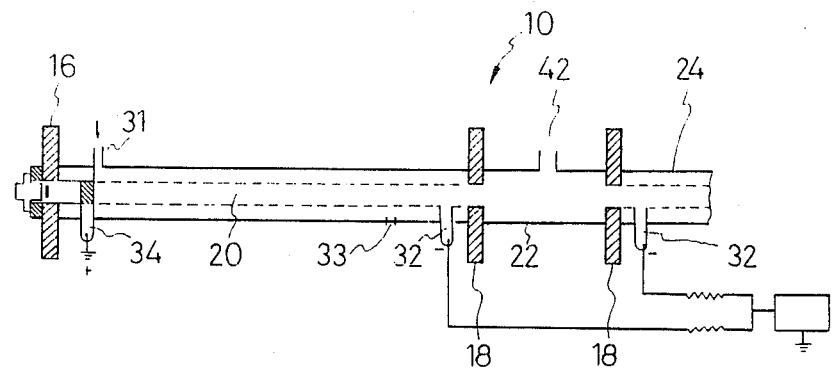
FIG. 3 is a schematic diagram, partially cut-away showing the resonant laser cavity system.
Figure 4:
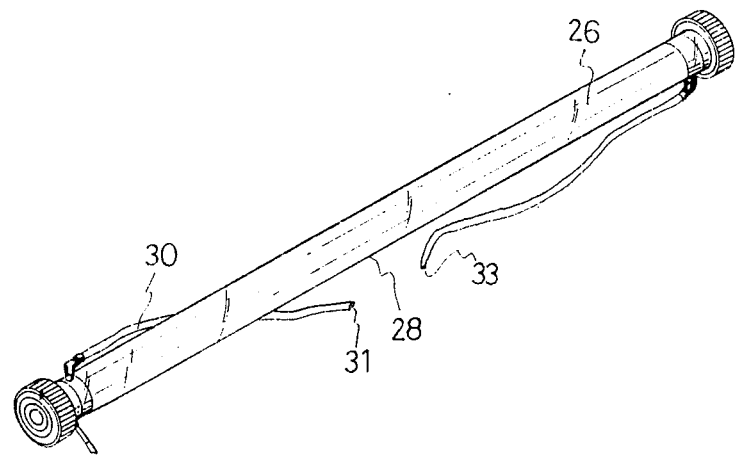
FIG. 4 is a perspective view of one of the discharge tube members showing both the inner and outer tubes, as well as a helically wound oil cooling conduit.
Figure 8:
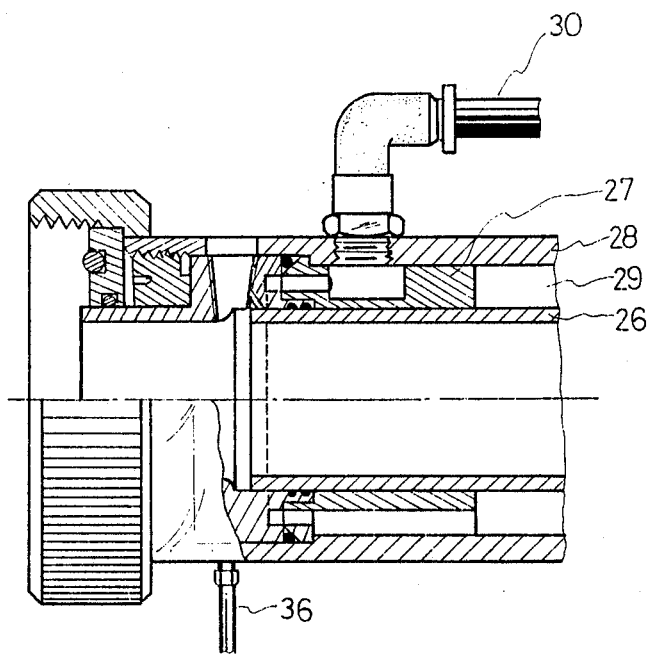
FIG. 8 is a cross-section, partially cut-away of one end of a discharge tube member; and, FIG. 9 is a cross-sectional view, partially cutaway of the resonant laser cavity system.

As is seen in FIG. 4, resonant laser cavity system 10 further includes inner tube 26 and outer tube 28. Inner and outer tubes 26 and 28 extend in axial direction 14 and are coaxial, as is shown in FIGS. 3 and 4. As shown in FIG. 8, inner and outer tubes 26 and 28 are maintained in fixed displacement to form annular channel 29 through use of spacer members 27 which allow for fixed separation of inner and outer tubes 26 and 28.

Inner tube 26 containing carbon dioxide gas is formed of a Pyrex glass. Additionally, outer discharge tube 28 is formed of an acrylic resin composition. The acrylic resin composition of outer discharge tube 28 has the advantage over prior Pyrex compositions, in that it has a higher ductility and a greater resistance to vibration and shock loading when taken with respect to a Pyrex glass composition. Additionally, further advantages are realized in the formation through simplicity of manufacture and overall reduction of maintenance costs when tubes 28 are in operational service. By formation of outer tube 28 of a high molecular weight polymer such as the aforementioned acrylic resin, the fragility of the overall system 10 is lowered and produces a highly reliable operating system.

Referring now to FIGS. 1-4, there is shown cooling oil conduit 30 which includes cooling oil outlet 31 and cooling oil inlet 33. As is known, laser electrodes must be cooled while generating laser power. In many prior systems, electrodes were cooled indirectly by water flow which provided for a low efficiency.

Referring now to FIG. 3, there is shown cathodes 32 and anodes 34 formed of a copper composition plated with nickel. Such seal the ends of inner tube members 26. The electrodes 34 and 32 allow oil to flow therethrough. Both inner and outer tubes 26 and 28 are coupled directly to electrodes 32 and 34 thus allowing the electrodes to be cooled directly.

As shown in FIG. 3, there is provided cooling oil outlet 31 and cooling oil inlet 33 for removal and insert of cooling oil for actuation of resonant laser cavity system 10.

Figure 2:
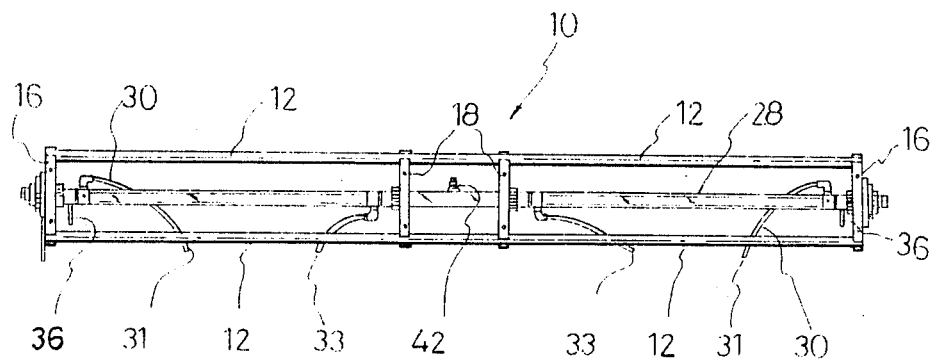
FIG. 2 is an elevational view of the resonant laser cavity system shown in FIG. 1.

Section 22 as shown schematically in FIG. 3 and in perspective in FIGS. 1 and 2, is formed of an acrylic resin. Section 22 provides for gas outlet port 42 for removal of the carbon dioxide gas. Outlet port 42 is coupled to an external vacuum pump (not shown).

Figure 7:
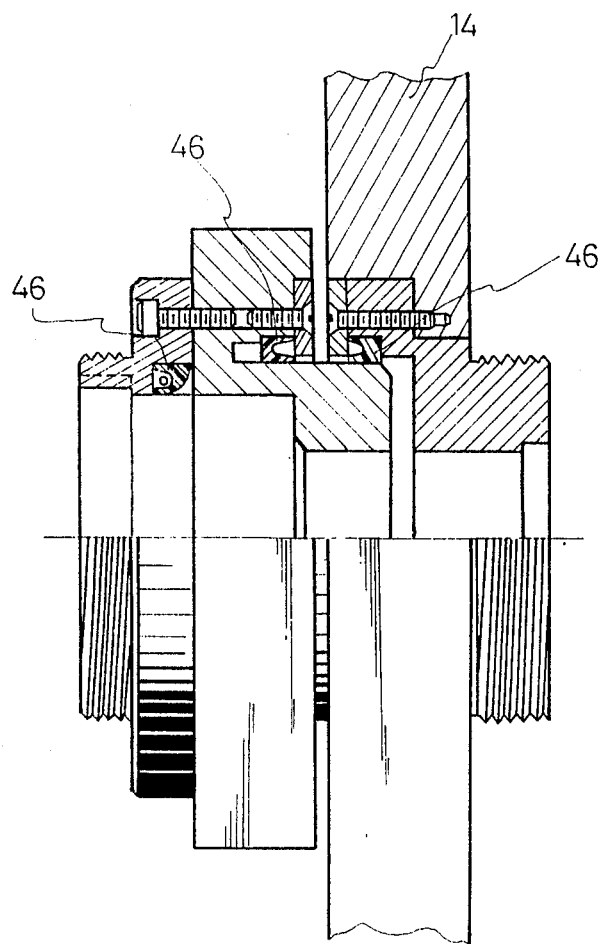
FIG. 7 is a cross-sectional view of a mirror mounting plate member partially cut-away and in assembled formation.
Figure 9:
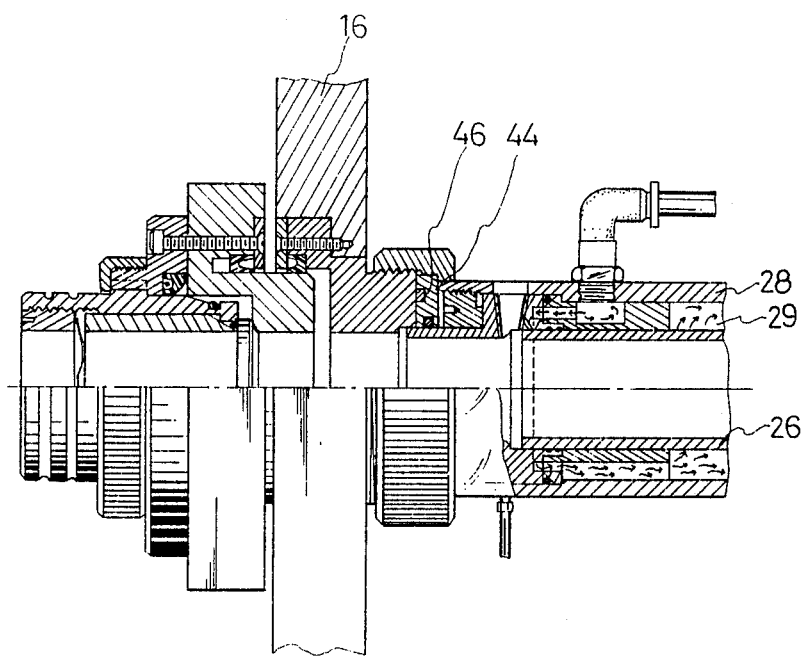

Sections 20, 22 and 24 of resonant laser cavity system 10 are coupled to form an overall laser resonant cavity through Teflon couplers. Each of the Teflon couplers as shown in FIG. 7, utilizes O-ring seals 46 internal thereto to prevent gas leakage and may be formed to hold a vacuum simply by hand tightening procedures. Teflon coupling members 44 shown in FIG. 9 provide for O-ring members 46 to prevent gas leakage from internal resonant laser cavity system 10.

Figure 5:
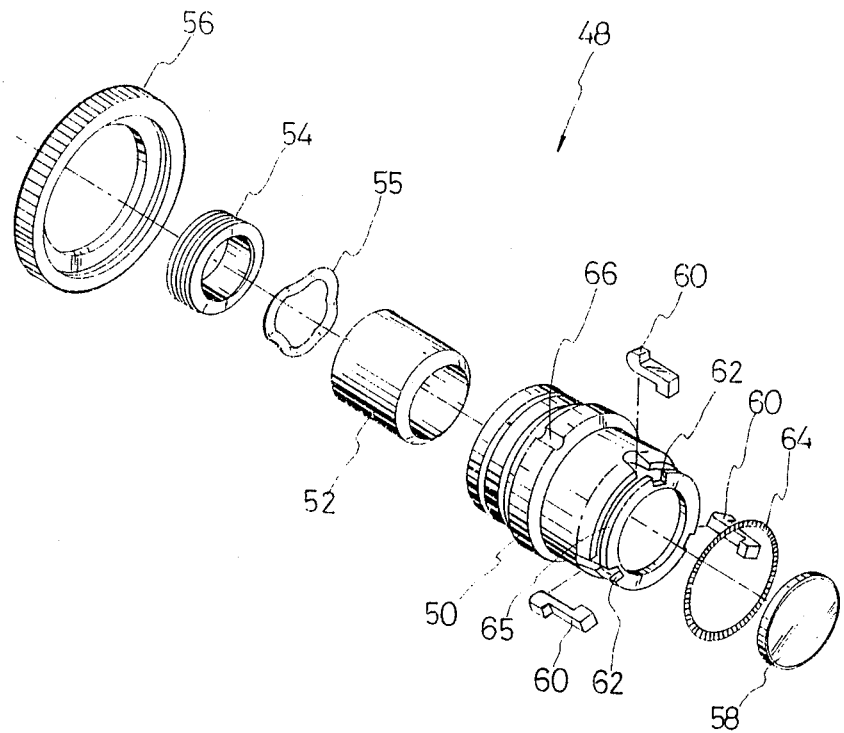
FIG. 5 is a perspective exploded view of a mirror mounting mechanism.

Referring now to FIGS. 5-7, there is shown mirror mounting mechanism 48 which includes tubular mount housing 50. As can be seen clearly in FIG. 5, screw free mount insert of extension tube member 52 and female quick connector 54, which is a fixing threaded member, are insertable within tubular mount housing 50. Cushioning spring 55 is provided for insert therein. Additionally, cap member in the form of a fixed ring 56 threadedly engages an outer wall of tubular mount housing 50 for releasable coupling purposes.

Reflecting mirror member 58 is positionally mounted and coupled without the necessity of threaded members. As can be seen in FIGS. 5 and 6, mirror member 58 is mounted to the exterior wall of tubular mount housing 50 by metal clamp clip members 60 which are insertable within respective housing grooves 62 and held in compressed fashion by coil spring 64.

This type of fastening technique is clearly advantageous, since clamp members 60 and mirror members 58 may be displaced in a radial direction with respect to axial direction 14 in order to maintain the center of mirror members 58 in a constant position during assembly procedures. This type of coupling essentially provides for a simple automatic focusing. Coil spring member 64 is insertable within coil spring groove 65 shown in FIG. 5. Groove 65 passes circumferentially around an outer wall of tubular mount housing 50.

The combination of the metal clamp members 60, coil spring 64, and mounting mirrors 58 additionally facilitates the replacement and cleaning of the mirror members 58 in a simple and efficient manner.

Tubular mount housing 50 further includes slot or groove 66 formed within an outer cylindrical surface to mate with a bar on the laser head in order that no relative motion exists between the mirror members 58 and the O-ring couplings.

We claim:

1. A resonant laser cavity system comprising:
   a pair of opposing discharge tube members,
   a central gas outlet tube member in communication with and sandwiched between said discharge tube members, said opposing discharge tube members defining a resonant cavity having mirror members secured on opposing ends thereof; and,
   means for mounting each of said mirror members at respective ends of said resonant cavity, said means for mounting each of said mirror members including a tubular mount housing having external walls having formed therein a plurality of circumferentially displaced grooves, a plurality of clip members insertable within said grooves for securing one of said mirror members to said mount housing, a coil spring member securable around said clip members for releasably securing one of said mirror members, each of said discharge tube members including an inner tube formed of Pyrex and an outer tube concentrically located with respect to said inner tube, said outer tube being formed of an acrylic composition, and further including a cooling oil conduit passing into said discharge tube member for insert of cooling oil therein.

2. The resonant laser cavity system as recited in claim 1 where said inner and outer tubes are coupled to electrodes within said discharge tube member, said electrodes being cooled by said cooling oil.

* * * * *